April 23, 1968        R. C. MATTER        3,379,576
ELECTROLYTE LEVEL INDICATOR
Filed July 21, 1965
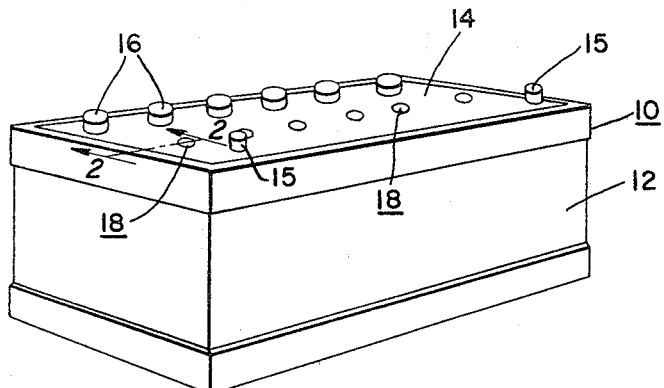
*Fig. 1*
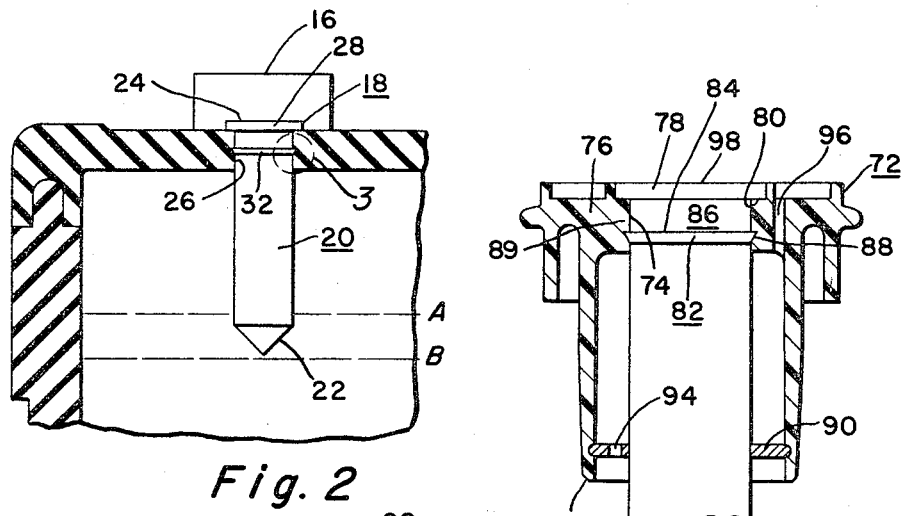
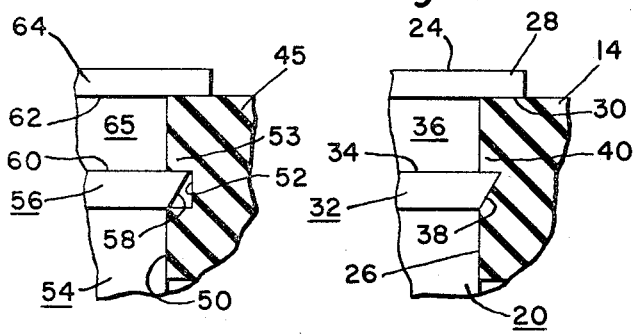
*Fig. 4*     *Fig. 3*
INVENTOR.
Robert C. Matter
BY
*J.C. Evans*
His Attorney United States Patent Office 3,379,576
Patented Apr. 23, 1968

3,379,576
ELECTROLYTE LEVEL INDICATOR
Robert C. Matter, Anderson, Ind., assignor to General Motors Corporation, Detroit, Mich., a corporation of Delaware
Filed July 21, 1965, Ser. No. 473,628
4 Claims. (Cl. 136—182)

ABSTRACT OF THE DISCLOSURE

A press fit rod for signaling a drop in the electrolyte level of an electrochemical cell wherein the rod is permanently seated in an aperture in the cell's closure member by means of two axially spaced annular flanges, one of which is beveled. The elastic character of the closure member material causes filling of the valley between the flanges to effect seating and sealing.

---

This invention relates to battery level indicator assemblies and more particularly to a battery level indicator including a light-transmissive rod member for indicating the level of electrolyte within a cell of a lead acid storage battery.

It is an object of the present invention to improve battery level indicator assemblies of the type including a light-transmissive member positioned for immersion in electrolyte within a battery cell by the provision of a combination unit including a battery cell closure member and an elongated rod with a prismatic light-reflective end and an opposite end including means integrally formed thereon for quickly fixedly securing the elongated rod to the battery cell closure member.

A further object of the present invention is to provide a battery level indicator assembly in the form of an elongated light-transmissive rod including a prism surface on one end thereof and an annular protuberance adjacent the other end thereof that is insertable within an opening in a cell closure member and press fittable against the cell closure member around the opening therein to prevent displacement of the rod with respect to the cell closure member and to further function as a seal against leakage of fluid from interiorly of the cell around the outer periphery of the indicator rod.

Further objects and advantages of the present invention will be apparent from the following description, reference being had to the accompanying drawings wherein preferred embodiments of the present invention are clearly shown.

In the drawings:

FIGURE 1 is a view in perspective of a lead acid storage battery including one embodiment of the present invention;

FIGURE 2 is an enlarged, fragmentary view in vertical section taken along the line 2—2 of FIGURE 1;

FIGURE 3 is an enlarged, fragmentary, sectional view of the area 3 in FIGURE 2;

FIGURE 4 is an enlarged, fragmentary, vertical, sectional view showing another embodiment of the invention; and FIGURE 5 is a vertical, sectional view of another embodiment of the invention.

Referring now to FIGURE 1, a lead acid storage battery 10 is illustrated including an outer casing 12 closed at an open upper end thereof by a cell closure member or cover 14 made from hard rubber material such as natural rubber compounds, synthetic rubber compounds, suitable plastic materials and the like. Battery terminals 15 are directed through the cover 14 at either end thereof. The representatively illustrated battery 10 has six cells each of which includes a fill opening closed by a vented fill cap 16. Furthermore, each of the cells has an electrolyte indicator device 18 associated therewith for producing an indication when the electrolyte level in a cell is at or below a desired fill level.

In FIGURES 2 and 3, one of the electrolyte level indicator assemblies 18 is shown as including an elongated rod 20 of a light-transmitting material such as Lucite having a suitable light reflective prismatic surface 22 on one end thereof and a flat, upper surface 24 on the opposite end thereof. The surface 22 is conically shaped and merely representative of one prismatic form. In such constructions, light falling on the surface 24 is collected, concentrated and directed downwardly through the elongated rod 20. When the electrolyte level is at a desired level A, the downwardly transmitted light is diffused into the electrolyte solution and the surface 24 of the rod 20 has a relatively dull appearance. When the electrolyte level is reduced to the level B, as shown in FIGURE 2, the light transmitted downwardly through the rod 20 is reflected by the prismatic surface 22 and redirected upwardly through the elongated rod 20 to cause the surface 24 to light sufficiently to give a warning indication of the reduction in the level of electrolyte in a particular cell.

As best seen in FIGURE 3, the elongated rod 20 is inserted through an opening 26 in the cell closure member 14 having an inside diameter substantially equal to the outside diameter of the rod 20. The rod 20 is located so that the prismatic surface 22 thereon is placed to an accurate depth within the cell interior by a head portion 28 on the upper end of the rod 20 that includes a lower annular surface 30 thereon that is in engagement with the top surface of the upper part of the closure member 14 around the opening 26 therein. Furthermore, in the embodiment of FIGURES 1 through 3 the upper end of the rod 20 includes an annular protrusion 32 thereon that includes a flat upper surface 34 spaced from the surface 30 on the head 28 to form a groove 36 on the end of the rod 20 opposite to the prismatic surface 22 thereon. The annular protrusion 32 includes an inclined continuous surface 38 thereon that is directed from the flat surface 34 thereon to merge with the outside diameter of the rod 20 below the surface 34.

By virtue of this construction, when the rod 20 is located by the head 28 within the opening 26, the inclined or beveled surface 38 on the annular protrusion 32 is depressed into the surrounding material of the closure member 14. The closure member 14 is thereby held between the head 28 and the protrusion 32 at 40 whereby the elongated rod 20 is fixed against any undesirable displacement thereof with respect to the level of electrolyte in the battery cell so as to continually give an accurate indication of the presence or absence of electrolyte through the flat surface 24 that is readily observable by a person from above the battery 10. Another feature of the annular protrusion 32 is that the surface 38 thereon, when depressed into the surrounding cover material, serves to produce a self-sealing elongated rod 20 to prevent leakage of material along the outer periphery thereof through the cell closure member 14. Another advantage of such an annular protrusion is that in many acid lead storage batteries, the casing 12 and cover 14 are constructed of a relatively hard, rubber-like material that, in the absence of such a protrusion 32, tends to expel a rod 20 exteriorly of an opening therethrough once it has been inserted therein. The protrusion 32 positively acts to prevent such relative movement between the elongated rod 20 and the closure member 14 whereby it is continually located to give an accurate indication of the electrolyte level in the battery cell.

Another embodiment of the invention is illustrated in FIGURE 4, which includes a battery cell closure member 45 having an opening 50 therethrough that includes an annular groove 52 formed in part by an annular portion 53 of member 45 having a predetermined thickness when unstressed. In this embodiment of the invention, an elongated light-transmitting rod 54 like the rod 20 in the first embodiment, is fitted through the opening 50 so that an annular protrusion 56 on the rod has a chamfered edge 58 thereof located within the groove 52. In this embodiment, the annular protrusion 56 includes a flat, upper surface 60 spaced a distance below the lower annular surface 62 of an upper head 64 like head 28 in the first embodiment that is less than the unstressed thickness of the member 45 at 53. The surfaces 60, 62 form an annular groove 65 on the upper end of the elongated rod 54 into which is fit the portion 53 of cell closure member 45 around the opening 50 therein. Since the distance between the surfaces 60, 62 is slightly less than the thickness of the portion 53 of the cell closure member 45 retained within the groove 64, the elongated light-transmitting rod 54 is tightly held in place on the cell closure member 48 to prevent relative displacement therebetween.

Still another embodiment of the present invention is illustrated in FIGURE 5 wherein an elongated rod of light-transmitting material 70 is shown associated with a cell closure member 72 in the form of a vented fill cap that is adapted to be inserted within a fill opening in a battery cover. In this arrangement, the elongated rod 70 is directed through an opening 74 in the top 76 of the member 72 so that a top head 78 on the rod has an annular recessed surface 80 thereof in engagement with the upper surface of the cap 76 around the opening 74 therein. The rod 70 also includes an annular protuberance 82 thereon having a flat upper surface 84 spaced from the surface 80 to form a groove 86 therebetween and an inclined surface 88 extending from the flat surface 84 to merge with the outer diameter of the rod 70 therebelow. Within the groove 86 formed between the surfaces 80, 84 an annular segment 89 of the member 72 is fitted to fixedly locate a prismatic end of the elongated rod 70 in indicating relationship with an electrolyte level within a battery cell when the member 72 is located within a cell fill opening to close the same. If desired, an annular baffle member 90 can be located between the rod 70 and the inside surface of a skirt 92 on the member 72 to block splashing of electrolyte into the interior space formed by the skirt 92. The baffle 90 in the illustrated embodiment includes an opening 94 therein that communicates through the interior of the cap 72 with a vent opening 96 in the top of the cap 72.

The vented fill cap closure member 72, when in place in a battery cover fill opening, locates a flat indicating surface 98 on the top of the rod 70 at a point readily observable to indicate the condition of the electrolyte level in the battery cell.

While the embodiments of the present invention as herein disclosed constitute preferred forms, it is to be understood that other forms might be adopted.

What is claimed is as follows:

1. In a battery assembly for containing an electrochemical cell having an electrolyte which varies in level during use, said assembly comprising a case for said cell, a closure for said case and an elongated rod of light transmitting material for giving a visual indication of the electrolyte level of said cell, said closure including a cover having at least one fill opening therein and a plug for said fill opening, at least one of said cover and said plug being made of a relatively hard rubber-like material and having an aperture therein, said rod of light-transmitting material press-fitted in said aperture, said rod having two ends, one end having a total light reflecting prism-like surface which extends into said case to a predetermined distance such that said one end of said rod contacts the surface of said electrolyte when the electrolyte level is acceptably high and does not contact said surface when the electrolyte level is undesirably low, the other end of said rod having at least two circumferential flanges spaced apart along the longitudinal axis of said rod to define a valley therebetween, the edge of one of said flanges being beveled toward the axis of the rod in a direction away from the other flange, said aperture having a circumscribing wall and a diameter approximately equal to the diameter of said rod in said valley and at least a portion of said aperture's circumscribing wall received in and substantially filling said valley to lockingly engage said rod with said closure member in a manner which substantially prevents the axial displacement of said rod with respect to said closure member.

2. An assembly as specified in claim 1 wherein said circumscribing wall of said aperture has an annular groove formed therein which mates with said beveled flange.

3. An assembly as specified in claim 1 wherein said aperture is surrounded by a recess in the outer surface of said cover, the circumferential rod flange closest to said one end of said rod has the beveled edge, and the other flange nests within said recess.

4. An assembly as specified in claim 1 wherein said closure aperture is in said plug.

References Cited

UNITED STATES PATENTS

| | | | |
|---|---|---|---|
| 1,883,971 | 10/1932 | Kryzanowsky | 73—327 |
| 2,487,831 | 11/1949 | Rupp | 136—182.1 XR |
| 2,786,196 | 3/1957 | Haynes et al. | 240—1 XR |
| 3,079,037 | 2/1963 | Schechter | 220—60 |
| 3,123,971 | 3/1964 | Atwood et al. | 73—327 X |
| 3,217,923 | 11/1965 | Price | 73—334 X |
| 3,228,288 | 1/1966 | Marien | 240—1 X |
| 3,287,173 | 11/1966 | Cox et al. | 136—177 |

LOUIS R. PRINCE, *Primary Examiner.*

DANIEL M. YASICH, *Assistant Examiner.*